US012596647B2

(12) United States Patent
Patel et al.

(10) Patent No.: US 12,596,647 B2
(45) Date of Patent: Apr. 7, 2026

(54) CACHE MANAGEMENT USING SHARED CACHE LINE STORAGE

(71) Applicant: Akeana, Inc., San Jose, CA (US)

(72) Inventors: Sanjay Patel, San Ramon, CA (US);
Yogesh Shamkant Thombre,
Pleasanton, CA (US)

(73) Assignee: Akeana, Inc., Santa Clara, CA (US)

( * ) Notice: Subject to any disclaimer, the term of this patent is extended or adjusted under 35 U.S.C. 154(b) by 0 days.

(21) Appl. No.: 18/413,211

(22) Filed: Jan. 16, 2024

(65) Prior Publication Data

US 2024/0241830 A1     Jul. 18, 2024

Related U.S. Application Data

(60) Provisional application No. 63/605,620, filed on Dec. 4, 2023, provisional application No. 63/602,514, filed on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun.

(Continued)

(51) Int. Cl.
*G06F 12/0817*     (2016.01)
*G06F 12/0868*     (2016.01)
*G06F 12/0873*     (2016.01)

(52) U.S. Cl.
CPC ...... *G06F 12/0828* (2013.01); *G06F 12/0868* (2013.01); *G06F 12/0873* (2013.01)

(58) Field of Classification Search
CPC ............. G06F 12/0828; G06F 12/0868; G06F 12/0873
See application file for complete search history.

(56) References Cited

U.S. PATENT DOCUMENTS 5,692,202 A * 11/1997 Kardach ............... G06F 1/3275
                                                    713/324
6,934,809 B2     8/2005 Tremblay et al.
(Continued)

FOREIGN PATENT DOCUMENTS

WO         2022117687 A1     6/2022

*Primary Examiner* — Jared I Rutz
(74) *Attorney, Agent, or Firm* — Adams Intellex, PLC

(57) ABSTRACT

Techniques for cache management based on cache management using memory queues are disclosed. A plurality of processor cores is accessed. The plurality of processor cores comprises a coherency domain. Two or more processor cores within the plurality of processor cores generate read operations for a common memory structure coupled to the plurality of processor cores. Coherency for the coherency domain is managed using a compute coherency block (CCB). The CCB includes a memory queue for controlling transfer of cache lines determined by the CCB. The memory queue includes an evict queue and a miss queue. Snoop requests are generated by the CCB. The snoop requests correspond to entries in the memory queue. Cache lines are transferred between the CCB and a bus interface unit. The transferring is controlled by the memory queue. The bus interface unit controls memory accesses.

20 Claims, 7 Drawing Sheets

Related U.S. Application Data 16, 2023, provisional application No. 63/471,283, filed on Jun. 6, 2023, provisional application No. 63/467,335, filed on May 18, 2023, provisional application No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023.

(56)  References Cited

U.S. PATENT DOCUMENTS

| | | | | |
|---|---|---|---|---|
| 7,065,632 | B1 * | 6/2006 | Col | G06F 9/3826 |
| | | | | 712/218 |
| 7,506,105 | B2 | 3/2009 | Al-Sukhni et al. | |
| 10,013,356 | B2 | 7/2018 | Chou | |
| 10,671,394 | B2 | 6/2020 | Britto et al. | |
| 10,929,948 | B2 | 2/2021 | Benthin et al. | |
| 11,288,405 | B2 | 3/2022 | Belgarric et al. | |
| 11,403,099 | B2 | 8/2022 | Cerny et al. | |
| 11,403,225 | B2 | 8/2022 | Zheng et al. | |
| 11,429,529 | B2 | 8/2022 | Hornung et al. | |
| 11,442,863 | B2 | 9/2022 | Shulyak et al. | |
| 11,474,130 | B2 | 10/2022 | Lentz et al. | |
| 11,486,911 | B2 | 11/2022 | Tuncer et al. | |
| 2004/0003336 | A1 * | 1/2004 | Cypher | G11C 29/42 |
| | | | | 714/763 |
| 2008/0109606 | A1 * | 5/2008 | Lataille | G06F 12/12 |
| | | | | 711/E12.051 |
| 2008/0162661 | A1 * | 7/2008 | Mannava | G06F 12/0831 |
| | | | | 709/213 |
| 2012/0060169 | A1 * | 3/2012 | Steffens | G06F 13/161 |
| | | | | 718/104 |
| 2016/0062890 | A1 * | 3/2016 | Salisbury | G06F 3/0613 |
| | | | | 711/146 |
| 2022/0004639 | A1 | 1/2022 | Yardi et al. | |
| 2022/0029780 | A1 | 1/2022 | Dafali | |
| 2022/0197657 | A1 | 6/2022 | Soundararajan et al. | |
| 2023/0315449 | A1 * | 10/2023 | Cunningham | G06F 7/24 |
| | | | | 712/7 |

\* cited by examiner

MULTICORE PROCESSOR 410

CORE N-1 460
PMP 462
MMU 464
I$ 466
D$ 468
L2 CACHE 470

CORE 1 440
PMP 442
MMU 444
I$ 446
D$ 448
L2 CACHE 450

CORE 0 420
PMP 422
MMU 424
I$ 426
D$ 428
L2 CACHE 430

L3 CACHE 412

JTAG 416

PLIC / ACLINT 414

AXI4 / ACE / CHI 418

AXI INTERCONNECT 480

PERIPHERALS 490

CACHE MANAGEMENT USING SHARED CACHE LINE STORAGE

RELATED APPLICATIONS

This application claims the benefit of U.S. provisional patent applications "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023. Each of the foregoing applications is hereby incorporated by reference in its entirety.

FIELD OF ART

This application relates generally to cache management and more particularly to cache management using shared cache line storage.

BACKGROUND

The invention of the transistor in 1947 led to a computational revolution in science, engineering, and mathematics, and gave rise to the creation of a new area of scientific inquiry, computer science. Transistors soon replaced vacuum tubes in analog computers and in logic circuits, resulting in smaller, cheaper, less power hungry, and significantly more reliable computers, calculators, and other devices. While these discrete devices were fully capable of producing voltages or currents that could represent logic "one" and logic "zero", the systems based on these devices were still relatively large and of limited computational utility. After several early attempts to integrate multiple transistors and other components onto or into a single substrate, the monolithic integrated circuit was invented in 1959. This new technique drastically changed how electronic logic or digital circuits were designed, quickly enabling increasing numbers of transistors or "devices" to be produced on a single substrate. As integrated circuit fabrication techniques improved, the functions that could be performed by the integrated circuits became increasingly complex. In 1971, the first commercially available "microprocessor" was released. This single-chip processor could be programmed for a wide variety of applications including computation and control. Integration design and fabrication techniques have continued to evolve, enabling the production of processors of previously unobtainable power and flexibility. As a result, prices for processors have progressed lower to a point where simple, inexpensive processors can be cost-effectively designed into common, everyday products. These products include kitchen appliances, personal care items, vehicles, and much, much more.

Modern integrated circuits or "chips" are now widely incorporated into commonly available devices, tools, and equipment. These integrated circuits can include several different functions in a single chip. Previous designs that placed the chips that accomplished the different functions onto a circuit board can now replace the multiple chips with "cores" integrated into a single chip. These cores can be purchased or licensed as intellectual property for inclusion in a design. The cores can include processors, memory, GPS units, radios, and cameras, among many other functions. The chips produced with these or other cores can be commonly found in electronic devices such as smartphones, tablets, televisions, laptop and desktop computers, gaming consoles, and more. The chips enable and greatly enhance device features and utility. These device features render the devices more useful and more central to the users' lives than were even recent, earlier generations of the devices. Electronic toys and games have benefited from the inclusion of advanced integrated circuits. The chips are programmed to greatly enhance engagement of players with widely different experience levels. Further, the chips can produce highly realistic audio and graphics, enabling players to engage mysterious and exotic digital worlds and situations. Integrated circuits are also found in vehicles of all types. The chips enable new and useful features to be added to the vehicles. The chips improve fuel economy and vehicle operating efficiency, vehicle safety, user comfort, and user entertainment.

SUMMARY

Electronic devices are widely used by many people around the world. The electronic devices include personal electronic devices such as computers, handheld electronic devices, and smartwatches; household devices including kitchen and cleaning appliances; personal, private, and mass transportation vehicles; and medical equipment; among many other familiar devices. One common element among all these devices is that they often contain some variety of integrated circuit or chip. These chips perform multifarious processing and control tasks, thereby rendering the devices that contain the chips far more desirable and useful. Electronic processors enable the devices to execute a wide variety of features and applications. The applications include data processing, entertainment, messaging, patient monitoring, telephony, vehicle access, configuration and operation control, etc. Further elements are coupled to the processors that enable the processors to execute the features and applications. The further elements typically include one or more of memories, radios, networking channels, peripherals, and so on. Portions of the contents of a memory, such as a shared or common memory, can be moved to local cache memory in order to boost processor performance. Using local cache memory takes advantage of locality typical to application code executed by the processors. The cache memory can be coupled to processors, thereby drastically reducing memory access times. Further, the cache memory is commonly smaller and faster than the common memory. The cache memory can be accessed by one, some, or all of a plurality of processors without having to access the slower common memory, thereby reducing access time and increasing processing speed. However, the use of smaller cache memory means that new cache lines must be brought into the cache memory to replace no-longer-needed cache lines (called a cache miss, which requires a cache line fill) and that existing cache lines in the cache memory that are no longer synchronized (coherent) must be evicted and managed across all caches and the common memory.

In disclosed techniques, the cache management issues are addressed by cache management using shared cache line storage. A compute coherency block can include a memory queue, where the memory queue can include an evict queue and a miss queue. The evict queue can manage cache lines evicted from the compute coherency block (CCB). The miss queue can manage cache lines read from the common memory structure (cache line fills). A snoop operation, or snoop request, can be generated by the CCB and can correspond to entries in the memory queue. Snoop operations can look for cache lines in caches in multiple CCBs and in common memory due to evicted cache lines and cache misses. The common memory can be coupled to the multiple CCBs using Network-on-Chip (NoC) technology. The snoop operations, based on the contents of the memory queue, can be used to determine whether evicted cache lines within the evict queue can be committed to storage in the common memory without overwriting data already in the common memory that is required by another processor. The snoop requests can further monitor transactions such as data reads from and data writes to the common memory. While read operations leave data contained within a cache or the common memory unchanged, a write operation to a cache or to the common memory can change data. As a result, the copy of the data within a cache can become "incoherent" or "dirty" with respect to the common memory, either due to changes to the cache contents or changes to the common memory contents. The data changes, if not monitored and corrected using cache management techniques, result in cache coherency problems. That is, new data can overwrite old data before the old data is used, old data is read before new data can be written, etc.

Cache management is enabled by cache management using shared cache line storage. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using a compute coherency block (CCB), wherein the CCB includes a memory queue for controlling cache line transfers as determined by the CCB. Snoop requests are generated by the CCB, wherein the snoop requests correspond to entries in the memory queue. Cache lines are transferred between the CCB and a bus interface unit, based on a response to the snoop requests, wherein the bus interface unit controls memory accesses. The cache line transfer is controlled by the memory queue.

A processor-implemented method for cache management is disclosed comprising: accessing a plurality of processor cores, wherein the plurality of processor cores comprises a coherency domain, and wherein two or more processor cores within the plurality of processor cores generate read operations for a common memory structure coupled to the plurality of processor cores; managing coherency for the coherency domain using a compute coherency block (CCB), wherein the CCB includes a memory queue for managing cache line transfers determined by the CCB; generating snoop requests by the CCB, wherein the snoop requests correspond to entries in the memory queue; and transferring cache lines between the compute coherency block and a bus interface unit, wherein the transferring is controlled by the memory queue.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
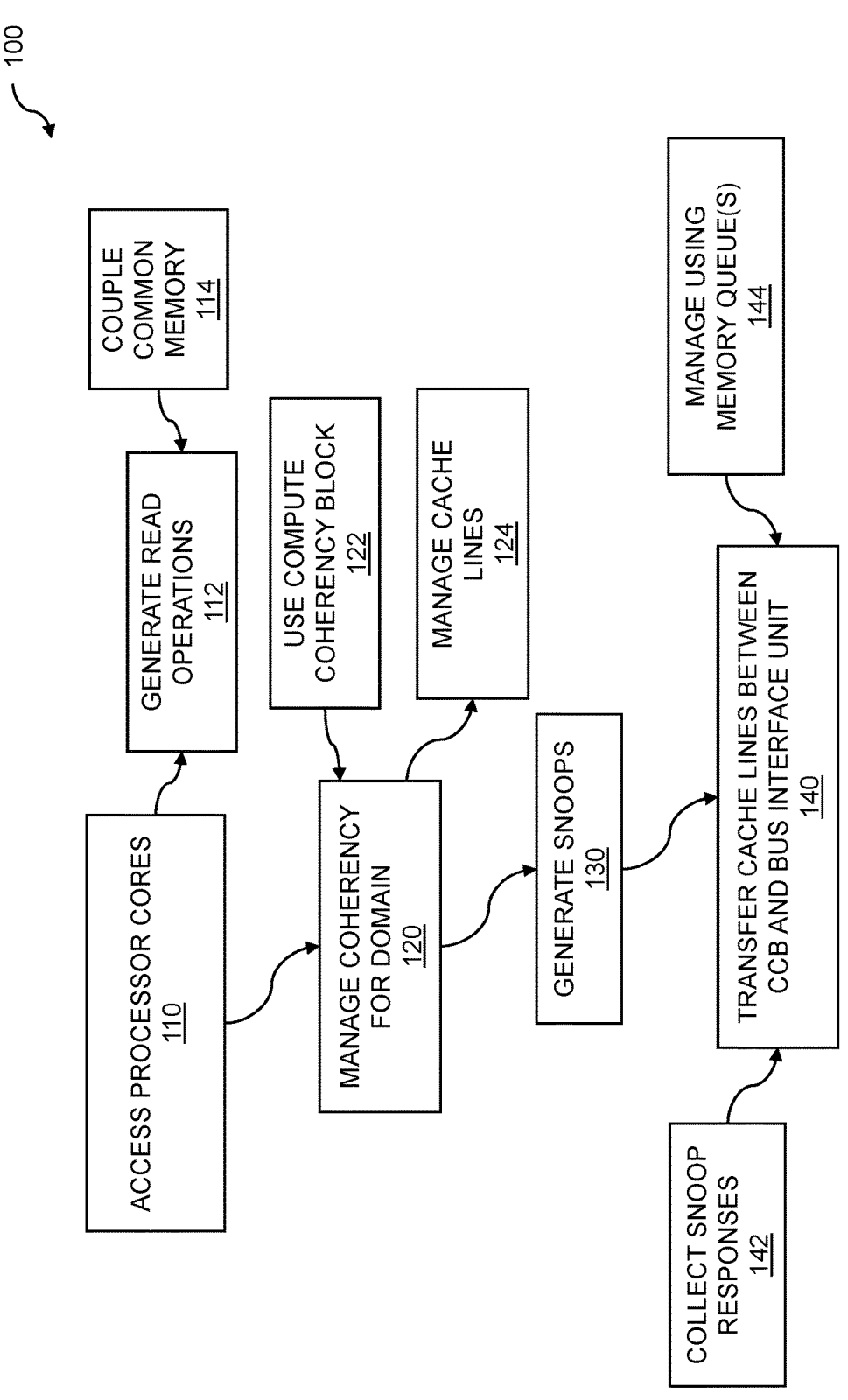
FIG. 1 is a flow diagram for cache management using shared cache line storage.

Techniques for cache management enabled by cache management using shared cache line storage are described. The cache management can maintain cache line validity and cache coherency among one or more processors, common memories, local caches, and so on. The processors can be used to accomplish a variety of data processing tasks. A processor can include a standalone processor, a processor chip, a processor core, a multi-core processor, and the like. The processing of data can be significantly enhanced by using two or more processors (e.g., parallel processors) to process the data. The processors can be performing substantially similar operations, where the processors can process different portions or blocks of data in parallel. The processors can be performing substantially different operations, where the processors can process different blocks of data or may try to perform different operations on the same data. Whether the operations performed by the processors are substantially similar or not, managing how processors access data is critical to successfully processing the data. Since the processor can operate on data in shared storage such as a common memory structure, and on copies of the common memory data loaded into local cache, data coherency between the common storage and the local caches must be maintained. Thus, when changes are made to a copy of the data, the changes must be propagated to all other copies of the data and to the common memory.

The execution rate of data processing operations such as those associated with large datasets, large numbers of similar processing jobs, and so on can be increased by using one or more local or "cache" memories. A cache memory can be used to store a local copy of the data to be processed, thereby making the data easily accessible. A cache memory, which by design is typically smaller and has much lower access times than a shared, common memory, can be coupled between the common memory and the processors. As the processors process data, they search first within the cache memory for an address containing the data. If the address is not present within the cache, then a "cache miss" occurs, and the data requested by the processors can be obtained from an address within the common memory. Data access by one or more processors using the cache memory is highly preferable to accessing common memory because of reduced latency associated with accessing the local cache memory as opposed to the remote common memory. The advantage of accessing data within the cache is further enhanced by the "locality of reference". The locality of reference indicates that code that is being executed tends to access a substantially similar set of memory addresses. The locality of reference can apply whether the memory addresses are located in the common memory or the cache memory. By loading the contents of a set of common memory addresses into the cache, the processors are, for a number of cycles, more likely to find the requested data within the cache. As a result, the processors can obtain the requested data faster from the cache than if the requested data were obtained from the common memory. However, due to the smaller size of the cache with respect to the common memory, a cache miss can occur when the requested memory address is not present within the cache. One cache replacement technique that can be implemented loads a new block of data from the common memory into the cache memory, where the new block contains one or more cache lines, and where a cache line can include the requested address. Thus, after the one or more cache lines are transferred to the cache, processing can again continue by accessing the faster cache rather than the slower common memory.

The processors can read a copy of data from a memory such as a cache memory, process the data, and then write the processed data back to the cache. As a result of the processing, the contents of the cache can be different from the contents of the common memory. Coherency management techniques can be used to keep the state of the data in the common memory and the shared data in the one or more caches "in sync". A complementary problem can occur when out-of-date data remains in the cache after the contents of the common memory are updated. As before, this state discrepancy can be remedied using coherency management techniques. In embodiments, additional local caches can be coupled to processors, groupings of processors, etc. While the additional local caches can greatly increase processing speed, the additional caches further complicate coherency management. Techniques presented herein address coherency management between common memory and the caches, and cache management based on using shared cache line memory. The memory queues can include evict queues, miss queues, and so on. Snoop operations, which can be based on access operations such as read operations generated by processors, can be used to search the memory queues to determine whether a difference exists between data in the common memory and data in the one or more caches. If differences are detected, then the cache maintenance operations can resynchronize the data between the common memory and the one or more caches. The cache maintenance operations can be based on transferring cache lines between the compute coherency block and a bus interface unit. The bus interface unit can provide access to the common memory. In addition to transfers from the common memory to caches based on cache misses, cache transfers can also occur from the cache to the common memory as a result of changes performed by the processors to the cache contents. The updated or "dirty" cache contents can be transferred to the common memory and can be copied to other caches in order to maintain coherency.

In disclosed techniques, the cache management issues are addressed by cache management using shared cache line storage. A compute coherency block can include a memory queue, where the memory queue can include an evict queue and a miss queue. The evict queue can manage cache lines evicted from the compute coherency block (CCB). The miss queue can manage cache lines read from the common memory structure (cache line fills). A snoop operation, or snoop request, can be generated by the CCB and can correspond to entries in the memory queue. Snoop operations can look for cache lines in caches in multiple CCBs and in common memory due to evicted cache lines and cache misses. The common memory can be coupled to the multiple CCBs using Network-on-Chip (NoC) technology. The snoop operations, based on the contents of the memory queue, can be used to determine whether evicted cache lines within the evict queue can be committed to storage in the common memory without overwriting data already in the common memory that is required by another processor. The snoop requests can further monitor transactions such as data reads from and data writes to the common memory. While read operations leave data contained within a cache or the common memory unchanged, a write operation to a cache or to the common memory can change data. As a result, the copy of the data within a cache can become "incoherent" or "dirty" with respect to the common memory, either due to changes to the cache contents or changes to the common memory contents. The data changes, if not monitored and corrected using cache management techniques, result in cache coherency problems. That is, new data can overwrite old data before the old data is used, old data is read before new data can be written, etc.

FIG. 1 is a flow diagram for cache management using shared cache line memory. The cache management can be applied to a coherency domain, where the coherency domain can include common memory, one or more local caches, a processor, one or more processor cores, and so on. A processor can include a multicore processor such as a RISC-V™ processor. The processor cores can comprise homogeneous processor cores or heterogeneous processor cores. The included cores can have substantially similar capabilities or substantially different capabilities. The processor cores can comprise further elements which can work in cooperation with the processor cores. The processor cores and the further elements can be coupled to a network, where the network can enable communications among the processors and the various elements. The network can include a network-on-chip (NoC). The further elements can include one or more of physical memory protection (PMP) elements, memory management (MMU) elements, level 1 (L1) caches such as instruction caches and data caches, level 2 (L2) caches, and the like. The multicore processor can further include a level 3 (L3) cache, test and debug support such as Joint Test Action Group (JTAG) elements, a platform-level interrupt controller (PLIC), an advanced core local interrupter (ACLINT), and so on. In addition to the elements just described, the multicore processor can include one or more interfaces. The interfaces can include one or more industry standard interfaces, interfaces specific to the multicore processor, and the like. In embodiments, the interfaces can include an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. The interfaces can enable connection between the multicore processor and an interconnect. In embodiments, the interconnect can include an AXI™ interconnect. The interconnect can enable the multicore processor to access a variety of elements such as storage elements, communications elements, peripherals, memory mapped input/output elements, etc.

The flow 100 includes accessing a plurality of processor cores 110. The processor cores can include homogeneous processor cores, heterogeneous processor cores, and so on. The cores can include general purpose cores, specialty cores, custom cores, and the like. In embodiments, the cores can be associated with a multicore processor such as a RISC-V™ processor. The cores can be included in one or more integrated circuits or "chips", application-specific integrated circuits (ASICs), programmable gate arrays (PGAs), etc. The cores can be included in the form of a high-level design language (HDL) delivery. In embodiments, the plurality of processor cores can include a coherency domain. The coherency domain can be used to maintain coherency among processor cores, processor cores and one or more cache memories, processor cores and one or more common memory structures, etc. In embodiments, each processor within the plurality of processor cores can be coupled to a dedicated local cache. A dedicated local cache can include a single level cache, a multilevel cache, and so on. A dedicated local cache can be coupled to more than one processor core. In embodiments, the dedicated local cache can be included in the coherency domain. Thus, coherency can be maintained among the plurality of processors, the dedicated local caches, and the common memory structure. In the flow 100, two or more processor cores within the plurality of processor cores generate read operations 112. The read operations can be used to access contents of one or more storage elements. The read operations can include read operations to a local cache, one or more shared caches, a common memory structure, and so on. Other operations can be generated by two or more processor cores. In embodiments, the two or more processor cores within the plurality of processor cores can generate write operations, read-modify-write operations, etc.

The flow 100 includes coupling 114 a common memory structure. The common memory structure can include a single port memory, a multiport memory, and the like. The common memory can be embedded or standalone, and it can utilize various memory technologies, such as dynamic random-access memory (DRAM), static random-access memory (SRAM), phase-change memory (PCM), NAND flash memory, and so on. The common memory structure can comprise various registers, flipflops, register files, caches, and so on. The common memory structure can be used to supply data to and receive data from a cache or cache hierarchy. The cache can comprise a multi-level cache, where the levels can include level 1 (L1), level 2 (L2), level 3 (L3), and so on. Each succeeding level can be larger and slower than the prior level such that L2 can be larger and slower than L1, L3 can be larger and slower than L2, and so on. In embodiments, the caches and even the common memory structure can have data regions and instruction regions (e.g., Harvard architecture). The data regions and instruction regions can include regions that are physically separated, logically separated, etc. The common memory structure can be accessible to the plurality of processor cores through an interconnect or a network, a bus, an interface element, etc. The interface element can support standard processor interfaces including an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. The interface elements can be coupled to the interconnect. The interconnect can include a bus, a network, and so on. The interconnect can include an AXI™ interconnect. In addition to the read operations generated by the one or more processor cores, other memory access operations such as write operations, read-modify-write operations, etc. can be performed. In embodiments, the memory accesses can be performed over a network-on-chip. The network-on-chip can enable data, instruction, control, and other information communication among the processors and the additional elements. In embodiments, the network-on-chip can be included in the coherency domain. The coherent network-on-chip can include coherency messaging (e.g., cache coherency transactions) and cache miss requests.

The flow 100 includes managing coherency 120 for the coherency domain. As presented above, the managing coherency can include managing coherency among the one or more processors, the local caches, the common memory structure, the network-on-chip, and so on. In the flow 100, the managing coherency is accomplished using a compute coherency block (CCB) 122. The compute coherency block can include a generator such as a snoop generator (discussed below), a memory queue, one or more processors and associated caches, and so on. The CCB can perform one or more cache coherency operations such as cache maintenance operations. The cache maintenance operations can maintain coherency among the processor cores, the common memory structure, the local caches, the network-on-chip, and other elements within the coherency domain. A subset of the cache maintenance operations can include cache block operations (CBOs). The cache block operations can accomplish a variety of data handling operations such as setting a state of all local caches into a particular state with respect to the common memory. The CBO operations can be applied to caches such as local caches within a coherency domain. The coherency domain can include the common memory, the local caches associated with groupings of processors, and so on. In order for the CBO operations to be performed within the coherency domain, the CBO operations can be mapped to standardized cache transactions. The standardized cache transactions can be associated with a processor type, an industry standard, and so on. In embodiments, standardized transactions can include cache maintenance operations supporting cache transactions such as ARM™ Advanced eXtensible Interface (AXI™) Coherence Extensions (ACE™) cache transactions, Advanced Microcontroller Bus Architecture (AMBA™) Coherence Hub Interface (CHI™) transactions, etc. The mappings of the CBOs can be different for transactions originating from cores or caches to cores globally, and to cores and caches locally in a compute coherency block (CCB). In embodiments, the cache coherency transactions can be issued globally before being issued locally. The issuing globally before issuing locally can accomplish saving new data to the common memory and sharing the new data to the other local caches. In embodiments, the cache coherency transactions that are issued globally can complete before cache coherency transactions are issued locally. In embodiments, the CCB can include a common ordering point for coherency management. The ordering point can be used to order memory access operations such as read operations.

In the flow 100, the CCB can include a memory queue for managing cache lines 124 determined by the CCB. The memory queue can comprise one or more queues. The memory queue can comprise a register for cache line identification, address, validity, as well as associated control logic. The memory queue does not store cache line data, because cache line data moving between the common memory and a CCB cache is stored in shared cache line memory, as described later. In embodiments, the memory queue can include an evict queue. The evict queue can be used for performing outbound memory access operations such as write or store operations. In embodiments, the evict queue contains cache line information about cache lines that are being evicted from the CCB. The CCB can transfer data such as cache lines, which can be written or stored in the common memory structure. In other embodiments, the memory queue can include a miss queue. The miss queue can be used for performing inbound memory access operations such as cache fill transfers associated with cache misses. In embodiments, the miss queue contains cache line information about cache lines to be read from the common memory structure. The memory access operations associated with the CCB can include non-cacheable memory accesses and cacheable memory accesses. A non-cacheable memory access can include an access sent directly to the common memory structure rather than to a cache such as a local cache. In embodiments, non-cacheable memory accesses can be targeted to memory mapped input and output (I/O) locations within the common memory structure. The memory I/O locations can include physical locations, relative locations, offset locations, etc. A location within the memory structure can include a physical address. The I/O locations can accomplish direct memory access operations. The non-cacheable addresses can include a number of data bits, bytes, words, and so on. In embodiments, the non-cacheable memory accesses can include 8, 16, 32, or 64 bits. Other bit, byte, or word data widths can also be used. In embodiments, the non-cacheable memory accesses can be aligned to a cache line boundary. A cache line can include a substantially similar number of bits to a non-cacheable memory access, or a substantially different number of bits. In embodiments, cacheable memory accesses can be targeted to storage locations within the common memory structure. The storage locations can include instructions, data, etc. In embodiments, the cache line can include 512 bits. One or more memory accesses can be required to fill a cache line.

The flow 100 includes generating snoop requests 130, by the CCB, wherein the snoop requests correspond to entries in the memory queue. Snoop operations can be generated to examine memory access operations to a location, a physical address, and so on. The snoop operations can be used to detect whether an operation executed by a second or other processor may impact data required by a processor. The snoop operations can be generated based on a unique physical address at which an access operation such as a read operation is targeted. Ordering of snoop operations can be based on an order of execution of instructions executing on a processor core, a priority of operations, and so on. One or more responses can be generated based on the snoop operations. Each snoop response corresponds to a snoop request operation. The snoop responses can include an indication of content differences among local caches and the common memory structure. The differences, when identified, can be remedied using one or more cache maintenance operations. Once all outstanding snoop responses are collected by the memory queue (evict queue and miss queue), coherency must be maintained and the memory queue can then control transfer of cache lines or partial cache lines between the CCB and the common memory. In embodiments, the evict queue controls transferring cache lines evicted from the CCB.

In addition to the snoop requests corresponding to entries in the memory queue, data access snoops can be submitted to a data region of the common memory structure and instruction access snoops can be submitted to an instruction region of the common memory structure. In other embodiments, data access snoops can be associated with a processor core load/store unit and instruction access snoops are associated with a processor core instruction fetch unit. In embodiments, the ordering and the mapping can include a common ordering point for coherency management. The ordering and the mapping can be used to identify what data in the common memory structure or within which cache has been changed since data was copied to one or more caches. In embodiments, the common ordering point can include a compute coherency block coupled to the plurality of processor cores. The compute coherency block can maintain coherency among the plurality of processor cores. In embodiments, the snoop responses can be based on completed snoop operations, if required. Other snoop operations can include pending snoop operations. The completion of pending snoop operations, if required, can be dependent on access times to access the common memory structure, access times to one or more local caches, and so on. Completion of the pending snoop operations can further be based on interface or bus contention.

The flow 100 includes transferring cache lines 140 between the CCB and a bus interface unit (BIU). The transferring can be based on a number of bits, bytes, words, and so on. The transferring can be based on a cache line width. In embodiments, the cache line comprises 512 bits. The transferring can include transferring from the evict queue within the memory queue associated with the CCB to a storage block within the bus interface unit. In embodiments, cache lines can be stored in a bus interface unit cache prior to commitment to the common memory structure. Committing a cache line to the common memory structure can be based on order of operation execution, operation priority, etc. In other embodiments, cache lines can be stored in a bus interface unit cache pending completion of a cache line fill from the common memory structure. The storage block can include one or more storage areas. In embodiments, the BIU storage block can include an evict storage area, a miss storage area, and so on. In the flow 100, the transferring is based on collection of all the required, pending snoop responses 142 to the snoop requests. The CCB can wait for a response before executing a transfer operation. In embodiments, the transferring can be initiated based on completed collection of outstanding snoop responses, if required. Once all responses are received from the one or more snoop operations, the transferring can be initiated. In the flow 100, the transferring can be managed using the memory queue or queues 144. The transfers can occur from the CCB to the BIU for evictions and from the BIU to the CCB for misses. In embodiments, the transferring can occur from the CCB to the bus interface unit when the cache line is an evicted cache line. An evicted cache line can include "dirty" data which can be sent to the common memory structure to update the contents of the common memory structure. In embodiments, the cache lines being controlled by the evict queue can be transferred to the bus interface unit, based on collection of all snoop responses. In other embodiments, the transferring can occur from the bus interface unit to the CCB when the cache line is a pending cache line fill. The cache line fill can result from a read operation cache miss. In embodiments, cache lines in the bus interface unit can be transferred to the CCB, based on CCB scheduling.

The memory access operation can access a location within the common memory structure. In embodiments, the memory access operation can include a data load (read) from the common memory structure. The memory access operation can further include a data store (write) to the common memory structure. In other embodiments, the memory access operation comprises an instruction fetch from the common memory structure. The instruction fetch can fetch one or more instructions in an instruction fetch operation. The comparison of the snoop operations and the snoop responses can be used to identify which of the one or more snoop operations corresponds to one or more snoop responses. Recall that a processor can generate two or more memory access operations such as read operations. In embodiments, the comparing can select the earliest snoop operation corresponding to the header of the two-dimensional matrix. The earliest snoop operation can be associated with an earliest memory access operation. Selecting the earliest snoop operation can be used to maintain coherency between one or more local caches and the common memory structure. In embodiments, the completing a memory access operation is based on the earliest snoop operation that was selected. Completing based on the earliest snoop operation that was selected can maintain a correct order of execution of memory access operations based on code executing on a processor core.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
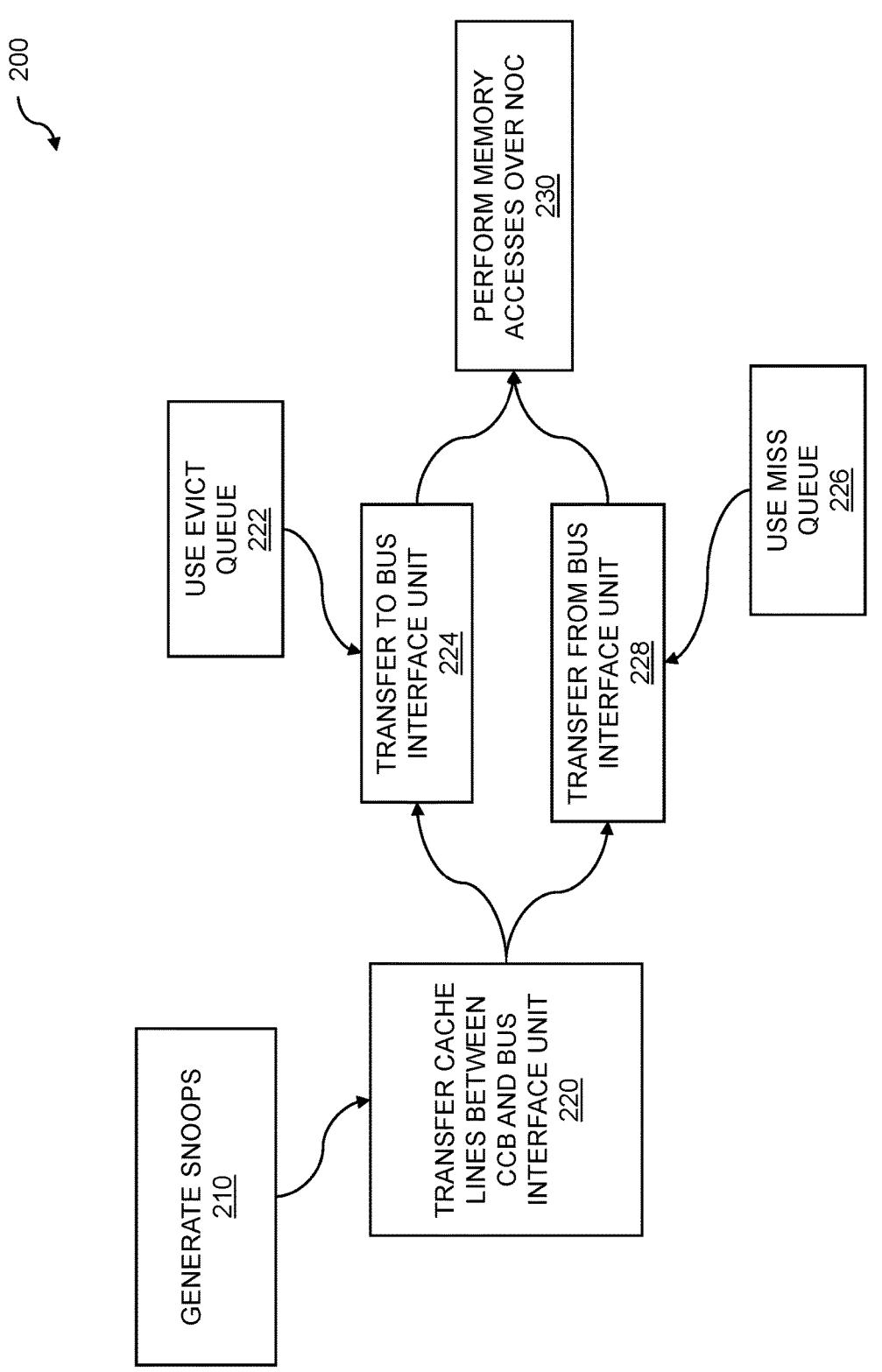
FIG. 2 is a flow diagram for memory queue usage.

FIG. 2 is a flow diagram for memory queue usage. The memory queue can be used to control the transfer of data such as cache line data. In embodiments, the cache line data can include evict queue cache line data, miss queue cache line data, and so on. Snoop operations generated by a compute coherency block can result in one or more snoop responses. The snoop operations and the snoop responses can be used to enable coherency management among a plurality of processors, one or more local caches, a shared, common memory, etc. The snoop operations can be performed on read operations generated by one or more processor cores. The snoop responses can enable transferring of cache lines between the CCB and the common memory structure using an interconnect, a network such as a network-on-chip, a bus, and so on.

Coherency between the caches and the common memory can be maintained using one or more cache coherency transactions. The coherency management is enabled by using memory queues. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using a compute coherency block (CCB), wherein the CCB includes a memory queue for managing or controlling the cache line transfers determined by the CCB. Snoop requests are generated by the CCB, wherein the snoop requests correspond to entries in the memory queue. Cache lines are transferred between the CCB and a bus interface unit, based on a response to the snoop requests, wherein the bus interface unit controls memory accesses. The cache line transfer is controlled by the memory queue.

The flow 200 includes generating snoop requests 210. Snoop operations can be used to monitor transactions such as bus transactions, where the bus transactions can be associated with memory access operations. The snoop operations can be generated by the compute coherency block, where the snoop requests correspond to entries in the memory queue. The memory access operations can include read, write, read-modify-write operations, etc. The snoop requests can be used to maintain coherency between data in the common memory and copies of the data in any caches. The snoop requests can determine whether data in the common memory or any shared copies of the data have been modified. If a modification has occurred, then the change can be propagated to all copies of the data so that all other copies of the data reflect the changes to the data. The copies of the data can be stored in cache memory, local memory, shared common memory, and so on. Thus, the snoop operations can request information associated with changes to local cache data, other local cache data, common memory data, and the like. A snoop response can be received in response to a snoop operation. A snoop operation can monitor memory access operations to determine whether an access operation can modify shared data at an address. If the access operation can modify data, then the snoop operation can determine whether a local copy of the shared data is the same as the modified data or different from the modified data. If different, then a coherency management operation can be performed to ensure that all copies of the shared data are coherent (e.g., substantially similar).

The flow 200 includes transferring cache lines 220 between the CCB and a bus interface unit. The bus interface unit can control memory accesses such as access to the common memory structure. In embodiments, the transferring can be initiated by collection of all pending responses to the snoop requests. In the flow 200, the memory queue can comprise an evict queue 222. The evict queue can include information on evicted cache lines, where the evicted cache lines can be evicted by the compute coherency block for various reasons. In the flow 200, the transferring can occur from the CCB to the bus interface unit 224 when the cache line is an evicted cache line. An evicted cache line can include a cache line to be written to or stored in the common memory. The evicted cache lines can include changed, modified, updated, or other data. In embodiments, cache lines can be stored in a bus interface unit cache or other similar storage prior to commitment to the common memory structure. In the flow 200, the memory queue can comprise a miss queue 226. The miss queue can include information on missed cache lines, where a missed cache line can include a cache line that needs to be fetched as a result of a cache miss. A cache miss results when requested data is not present within a local cache and instead must be accessed from the common memory. In embodiments, the miss queue can manage cache lines to be read from the common memory structure. The transferring can occur from the bus interface unit to the CCB when the cache line is a pending cache line fill and the CCB is ready to accept the cache line. In the flow 200, cache lines can be transferred from the bus interface unit to the CCB 228. The cache lines are scheduled by the miss queue and can be targeted for one or more caches within the CCB or directly to a processor within the CCB. In embodiments, cache lines can be stored in a bus interface unit cache pending completion of a cache line fill received from the common memory structure. In embodiments, cache lines in the bus interface unit are scheduled for transfer to the CCB by the miss queue, based on completion of all required, pending snoop responses.

Discussed previously and throughout, common memory structure accesses, such as read operations generated by one or more processors cores, can be accomplished using an interconnect, a bus, a network, and so on. In the flow 200, the memory accesses are performed over a network-on-chip 230. The network-on-chip, or NoC, can enable communications among cores and elements of an integrated circuit. The cores can include processor cores, multiprocessor cores, and so on. The elements can include memories, caches, queues, cache coherency units, bus interface units, and so on. In embodiments, the network-on-chip can be included in a coherency domain. The coherency domain can include memory, one or more caches, etc., for which coherency is maintained.

In embodiments, the cache maintenance operation can include cache block operations. A cache block can include a portion or block of common memory contents, where the block can be moved from the common memory into a local cache. In embodiments, the cache block operations can include a cache line zeroing operation, a cache line cleaning operation, a cache line flushing operation, and a cache line invalidating operation. These operations are discussed in detail below. The cache block operations can be used to maintain coherency. In embodiments, the cache line zeroing operation can include uniquely allocating a cache line at a given physical address with a zero value. The zero value can be used to overwrite and thereby clear previous data. The zero value can indicate a reset value. The cache line can be set to a nonzero value if appropriate. In embodiments, the cache line cleaning operation can include making all copies of a cache line at a given physical address consistent with that of memory. Recall that the processors can be arranged in groupings of two or more processors and that each grouping can be coupled to a local cache. One or more of the local caches can contain a copy of the cache line. The line cleaning operation can set or make all copies of the cache line consistent with the common memory contents. In other embodiments, the cache line flushing operation can include flushing any dirty data for a cache line at a given physical address to memory and then invalidating any and all copies. The "dirty" data can result from processing a local copy of data within a local cache. The data within the local cache can be written to the common memory to update the contents of the physical address in the common memory. In further embodiments, the cache line invalidating operation can include invalidating any and all copies of a cache line at a given physical address without flushing dirty data. Having flushed data from a local cache to update the data at a corresponding location or physical address in the common memory, all remaining copies of the old data within other local caches becomes invalid.

The cache line instructions just described can be mapped to standard operations or transactions for cache maintenance, where the standard transactions can be associated with a given processor type. In embodiments, the processor type can include a RISC-V™ processor core. The standard cache maintenance transactions can differ when transactions occur from the cores and when transactions occur to the cores. The transactions can comprise a subset of cache maintenance operations, transactions, and so on. The subset of operations can be referred to as cache block operations (CBOs). The cache block operations can be mapped to standard transactions associated with an ARM™ Advanced eXtensible Interface (AXI™) Coherence Extensions (ACE™) interface, an Advanced Microcontroller Bus Architecture (AMBA™) Coherence Hub Interface (CHI™), etc. In embodiments, the cache coherency transactions can be issued globally before being issued locally. A globally issued transaction can include a transaction that enables cache coherency from a core to cores globally. The issuing cache coherency transactions globally can prevent invalid data from being processed by processor cores using local, outdated copies of the data. The issuing cache coherency transactions locally can maintain coherency within compute coherency blocks (CCBs) such as groupings of processors. In embodiments, the cache coherency transactions that are issued globally can complete before cache coherency transactions are issued locally. A variety of indicators, such as a flag, a semaphore, a message, a code, and the like, can be used to signify completion. In embodiments, an indication of completeness can include a response from the coherent network-on-chip.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
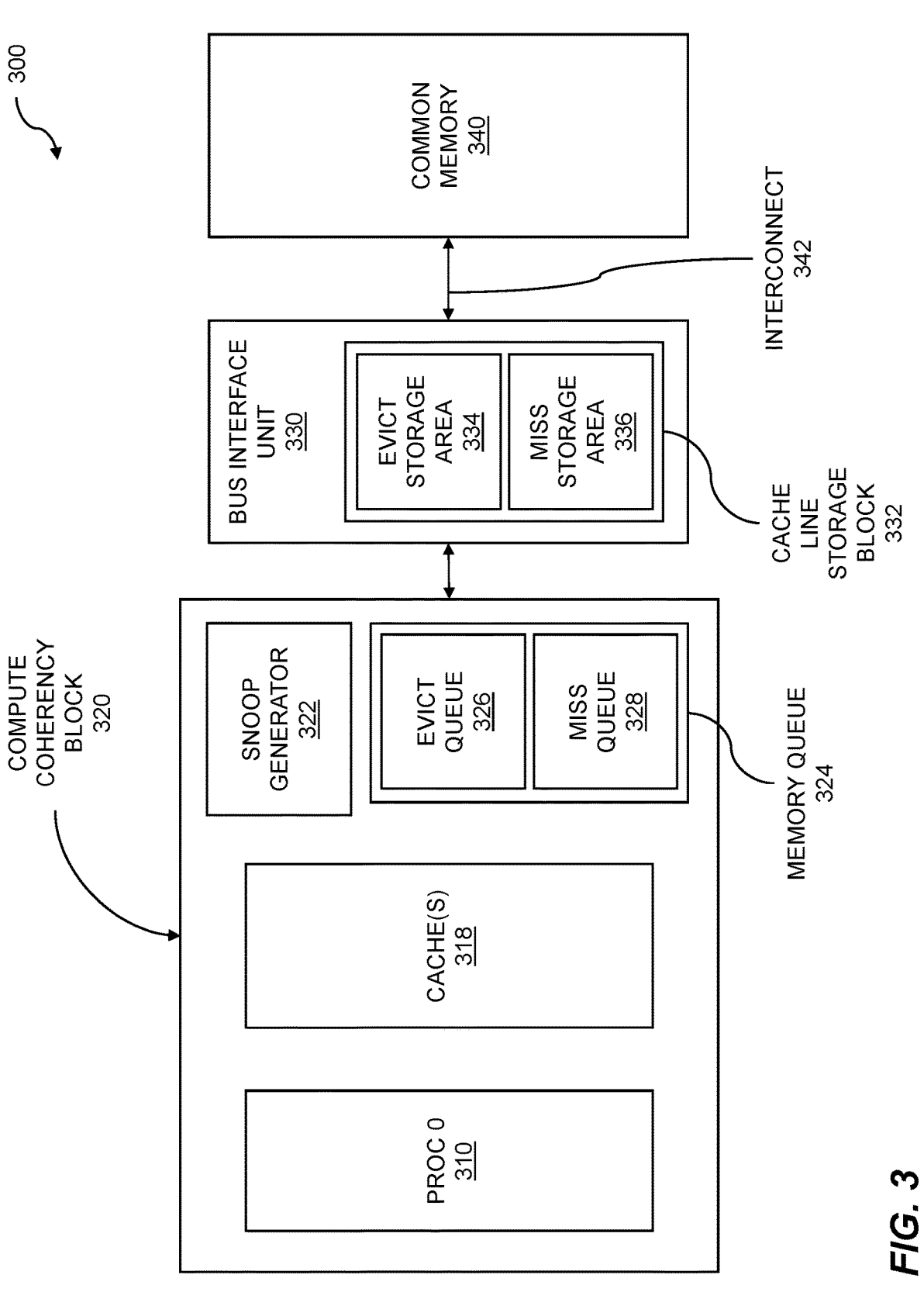
FIG. 3 is a system block diagram showing memory queues.

FIG. 3 is a system block diagram showing memory queues. Memory queues can be used by a component such as a compute coherency block to provide cache management among processor cores, one or more cache memories, a shared common memory, and so on. The memory queues can be used to enable the transfer of cache lines such as evicted cache lines, missed cache lines, partial cache lines, non-cacheable "cache lines", and so on. The one or more processors such as multicore processors can access the shared, common memory structure. Processor cores can be coupled to a local cache, where the local cache can be colocated with the processor cores, adjacent to the processor cores, and so on. The local cache can be loaded with data from a source such as the shared, common memory. The processors coupled to the local cache can process the data. Processing the data in the local cache can cause the data to become "dirty" or different from the contents of the common memory. Noted throughout, processor cores and groupings of processor cores can be coupled to their own local caches, and the processor cores can make changes to local cache data. Thus, the problem of maintaining coherence between the contents of the common memory, local caches, queues, processors, etc. becomes highly complex. To resolve the coherency challenges, memory queue techniques can be applied to read operations generated by the processor cores. Snooping operations or "snoops" can be generated by a compute coherency block (CCB). Reponses to the snoops can enable transferring of cache lines between the CCB and a shared cache line storage block in a bus interface unit (BIU). The BIU can be used to control memory accesses to a memory such as the common memory.

The system block diagram 300 includes a processor such as processor 0 310. More than one processor can be included. The processors can include multicore processors such as a RISC-V™ processor. The processors can generate read operations, which can be for a common memory structure coupled to the processor core. The read operations can be generated by any number of other processor cores located within a coherency domain. The system block diagram 300 can include a compute coherency block 320. The compute coherency block can be responsible for coherency between one or more caches such as local caches 318 associated with the processor core or other caches staged elsewhere in the CCB (not shown). The compute coherency block can perform one or more cache maintenance operations (discussed below) such as resolving data inconsistencies due to "dirty" data in one or more caches. The dirty data can result from changes to the local copies of common memory contents in the local caches. The changes to the local copies of data can result from processing operations performed by the processor cores as the cores execute code. Similarly, data in the common memory can be different from the data in a local cache due to an operation such as a write operation.

The coherency block 320 can include a snoop generator 322. Snoop operations can be used to detect storage access operations that can change data at a storage address of interest. Recall that two or more processor cores can access the common memory, one or more local caches, memory queues, and so on. Access by a memory core to an address associated with any of the storage elements can change the data at that address. The snoop operations can be used to determine whether an access operation to a storage address could cause a cache coherency problem, such as overwriting data waiting to be read, reading old or stale data, and so on. In embodiments, the snoop operations can be based on physical addresses for the common memory structure. The physical addresses can include absolute, relative, offset, etc. addresses in the common memory structure. In the system block diagram 300, the coherency block can further include a memory queue 324. The memory queue can include one or more queues, where a queue can control one or more cache line transfers. In embodiments, the memory queue can include an evict queue 326 and a miss queue 328. The evict queue can include information on cache lines "evicted" from the cache 318 for a variety of reasons. The evicted cache lines can include cache lines to be stored in the common memory structure. The miss queue can include information on cache lines associated with cache misses. The cache lines associated with the miss queue can include cache lines requested by one or more memory access operations generated by one or more processor cores.

The system block diagram 300 can include a bus interface unit (BIU) 330. The BIU can provide an interface between the compute coherency block 320 and an interconnect 342. In embodiments, the interconnect can be a system bus or an interconnect network such as a network-on-chip (NoC). The NoC can provide connectivity to a common memory structure 340. The bus interface unit can include a cache line storage block 332. The storage block can include a storage element such as a memory, a cache memory, a multilevel cache memory, a queue, a register, a register stack, and so on. The storage block can include one or more storage areas, regions, partitions, etc. In the system block diagram 300, the storage block can include an evict storage area 334 and a miss storage area 336. The evict storage area can store evicted cache lines, and the miss storage area can store missed cache lines. In embodiments, cache lines can be transferred between the CCB and the bus interface unit. The transferring can be controlled by the memory queue. The transferring can be based on at least one response to the snoops generated by the CCB. The response can comprise the collection of all required, pending snoop request responses, that is, all snoop requests that need to complete for a particular operation have indeed been completed. Note that not all operations require a response to the snoop request in order for it to be satisfied. The transferring can be based on CCB scheduling. Cache lines can be transferred based on a variety of system states, program states, data states, etc. In embodiments, the transferring can occur from the CCB to the bus interface unit when the cache line is an evicted cache line. Recall that a cache line can be evicted from the CCB in order to transfer the cache line to the shared memory. The cache line transfer can be based on a write or store operation to the system memory.

The system block diagram 300 can include a shared, common memory structure 340. The common memory structure can include memory colocated with the processor cores, adjacent to the processor cores, and so on. The common memory structure can include a cache memory, a multilevel cache memory, a large, shared memory structure, etc. In embodiments, the bus interface unit 330 can access the common memory structure 340 through an interconnect 342. The common memory can communicate with the bus interface unit 330 using a variety of protocols, where the protocols can include one or more industry standard protocols, proprietary protocols, etc. The interconnect can include a bus, a network, and so on. The interconnect can include an AXI™ interconnect. In embodiments, the network can include network-on-chip functionality. The AXI™ interconnect can be used to connect memory-mapped "master" or boss devices to one or more "slave" or worker devices. In the block diagram 300, the AXI interconnect can provide connectivity between a processor such as processor 310 and one or more peripherals (not shown). The one or more peripherals can include storage devices, networking devices, and so on. The peripherals can enable communication using the AXI™ interconnect by supporting standards such as AMBA™ version 4, among other standards.

Figure 4:
FIG. 4 is a block diagram illustrating a RISC-V processor.

FIG. 4 is a block diagram illustrating a RISC-V™ processor. The processor can comprise multiple processor cores, where two or more processor cores can be associated with the processor. The processor, such as a RISC-V™ processor, can include a variety of elements. The elements can include a plurality of processor cores, one or more caches, memory protection and management units, local storage, and so on. The elements of the multicore processor can further include one or more of a private cache, a test interface such as a Joint Test Action Group (JTAG) test interface, one or more interfaces to a network such as a network-on-chip (NoC), a coupling to a common memory structure, peripherals, and the like. The multicore processor is enabled by cache management using shared cache line storage. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using one or more compute coherency block (CCBs), wherein the CCBs include a memory queue for controlling cache line transfers that are determined by the CCB. Snoop requests are generated by the CCB, wherein the snoop requests correspond to entries in the memory queue. Cache lines are transferred between the CCB and a bus interface unit, based on a response to the snoop requests, wherein the bus interface unit controls memory accesses.

The block diagram 400 can include a multicore processor 410. The multicore processor can comprise two or more processors, where the two or more processors can include homogeneous processors, heterogeneous processors, etc. In the block diagram, the multicore processor can include N processor cores such as core 0 420, core 1 440, core N-1 460, and so on. Each processor can comprise one or more elements. In embodiments, each core, including cores 0 through core N-1 can include a physical memory protection (PMP) element, such as PMP 422 for core 0, PMP 442 for core 1, and PMP 462 for core N-1. In a processor architecture such as the RISC-V™ architecture, PMP can enable processor firmware to specify one or more regions of physical memory such as cache memory of the common memory, and to control permissions to access the regions of physical memory. The cores can include a memory management unit (MMU) such as MMU 424 for core 0, MMU 444 for core 1, and MMU 464 for core N-1. The memory management units can translate virtual addresses used by software running on the cores to physical memory addresses with caches, the common memory system, etc.

The processor cores associated with the multicore processor 410 can include caches such as instruction caches and data caches. The caches, which can comprise level 1 (L1) caches, can include an amount of storage such as 16 KB, 32 KB, and so on. The caches can include an instruction cache I\$ 426 and a data cache D\$ 428 associated with core 0; an instruction cache I\$ 446 and a data cache D\$ 448 associated with core 1; and an instruction cache I\$ 466 and a data cache D\$ 468 associated with core N-1. In addition to the level 1 instruction and data caches, each core can include a level 2 (L2) cache. The level 2 caches can include L2 cache 430 associated with core 0; L2 cache 450 associated with core 1; and L2 cache 470 associated with core N-1. Each core associated with multicore processor 410, such as core 0 420, and its associated cache(s), elements, and units can comprise a CCB. Each CCB can communicate with other CCBs that comprise the coherency domain. The cores associated with the multicore processor 410 can include further components or elements. The further elements can include a level 3 (L3) cache 412. The level 3 cache, which can be larger than the level 1 instruction and data caches, and the level 2 caches associated with each core, can be shared among all of the cores. The further elements can be shared among the cores. The further elements can be unique to a given CCB or can be shared among various CCBs. In embodiments, the further elements can include a platform level interrupt controller (PLIC) 414. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 416. The JTAG can provide boundary within the cores of the multicore processor. The JTAG can enable fault information to a high precision. The high-precision fault information can be critical to rapid fault detection and repair.

The multicore processor 410 can include one or more interface elements 418. The interface elements can support standard processor interfaces such as an Advanced eXtensible Interface (AXI™) such as AXI4™, an ARM™ Advanced eXtensible Interface (AXI™) Coherence Extensions (ACE™) interface, an Advanced Microcontroller Bus Architecture (AMBA™) Coherence Hub Interface (CHI™), etc. In the block diagram 400, the interface elements can be coupled to the interconnect. The interconnect can include a bus, a network, and so on. The interconnect can include an AXI™ interconnect 480. In embodiments, the network can include network-on-chip functionality. The AXI™ interconnect can be used to connect memory-mapped "master" or boss devices to one or more "slave" or worker devices. In the block diagram 400, the AXI interconnect can provide connectivity between the multicore processor 410 and one or more peripherals 490. The one or more peripherals can include storage devices, networking devices, and so on. The peripherals can enable communication using the AXI™ interconnect by supporting standards such as AMBA™ version 4, among other standards.

Figure 5:
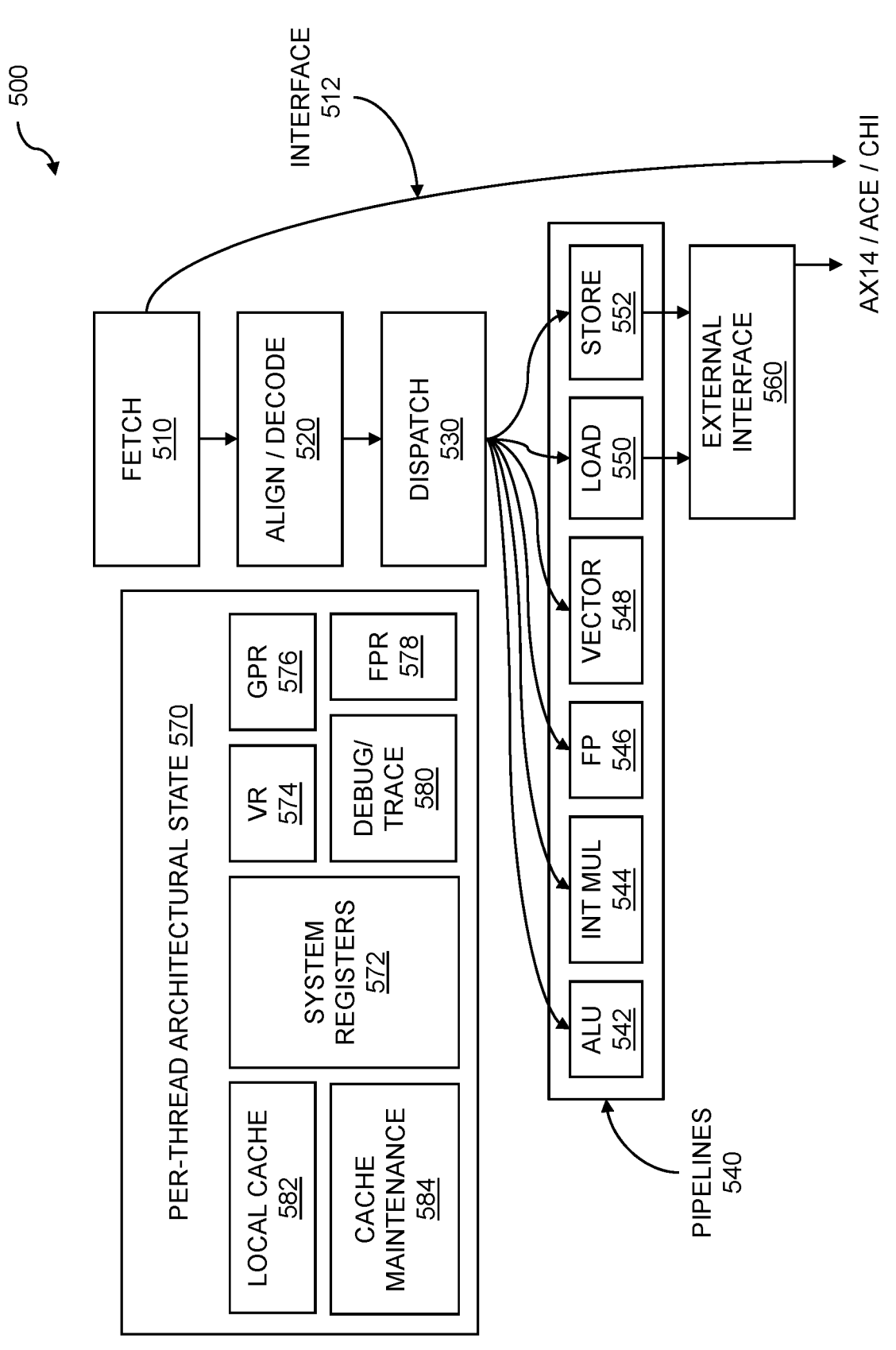
FIG. 5 is a block diagram for a pipeline.

FIG. 5 is a block diagram for a pipeline. The use of one or more pipelines associated with a processor architecture can greatly enhance processing throughput. The processor architecture can be associated with one or more processor cores, multiprocessors, and so on. The processing throughput can be increased because multiple operations can be executed in parallel. The use of one or more pipelines supports cache management using memory queues. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using a compute coherency block (CCB), wherein the CCB includes a memory queue for storing cache lines determined by the CCB. Snoop requests are generated, by the CCB, wherein the snoop requests correspond to entries in the memory queue. Cache lines are transferred between the CCB and a bus interface unit, based on a response to the snoop requests, wherein the bus interface unit controls memory accesses. The cache line transfer is controlled by the memory queue.

The FIG. 500 shows a block diagram of a pipeline such as a processor core pipeline. The blocks within the block diagram can be configurable in order to provide varying processing levels. The varying processing levels can be based on processing speed, bit lengths, and so on. The block diagram 500 can include a fetch block 510. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 512. The interface can include a standard interface such as one or more industry standard interfaces. The interfaces can include an Advanced eXtensible Interface (AXI™), an ARM™ Advanced eXtensible Interface (AXI™) Coherence Extensions (ACE™) interface, an Advanced Microcontroller Bus Architecture (AMBA™) Coherence Hub Interface (CHI™), etc.

The block diagram 500 includes an align and decode block 520. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 500 can include a dispatch block 530. The dispatch block can receive decoded instruction packets from the align and decode block. The decoded instruction packets can be used to control a pipeline 540, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 542, integer multiplier pipelines 544, floating-point unit (FPU) pipelines 546, vector unit (VU) pipelines 548, and so on. The dispatch unit can further dispatch instructions to pipelines that can include load pipelines 550, and store pipelines 552. The load pipelines and the store pipelines can access storage such as the common memory using an external interface 560. The external interface can be based on one or more interface standards such as the Advanced eXtensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 570. The inclusion of the per-thread architectural state can be based on a configuration or architecture that can support multi-threading. In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 572. The system registers can be associated with individual processors, a system comprising multiple processors, and so on. The system registers can include exception and interrupt components, counters, etc. The per-thread architectural state can include further registers such as vector registers (VR) 574, general purpose registers (GPR) 576, and floating-point registers 578. These registers can be used for vector operations, general purpose (e.g., integer) operations, and floating-point operations, respectively. The per-thread architectural state can include a debug and trace block 580. The debug and trace block can enable debug and trace operations to support code development, troubleshooting, and so on. In embodiments, and external debugger can communicate with a processor through a debugging interface such as a joint test action group (JTAG) interface. The per-thread architectural state can include local cache state 582. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 584. The cache maintenance state can include maintenance needed, maintenance pending, maintenance complete states, etc.

Figure 6:
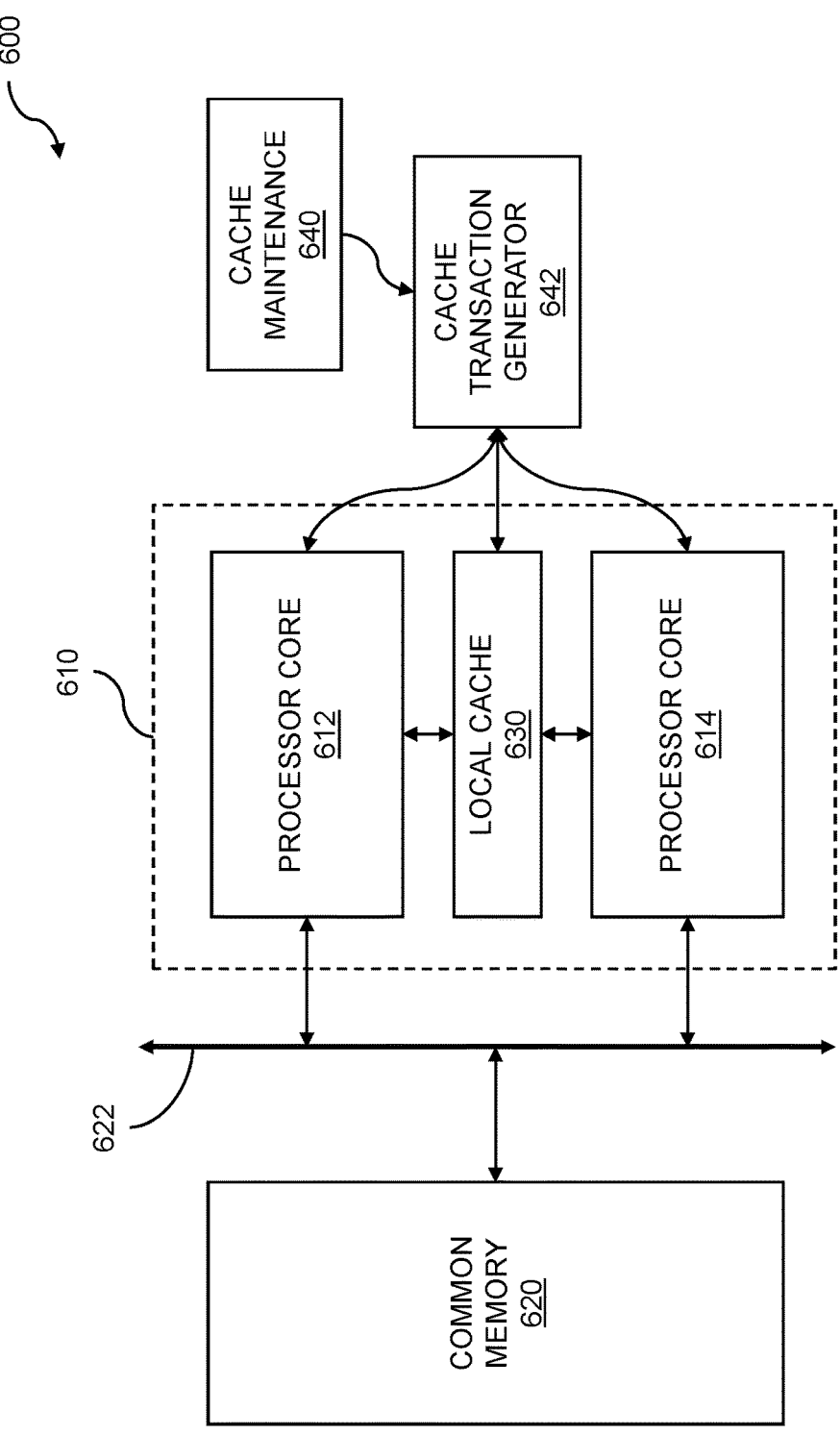
FIG. 6 is a system block diagram illustrating processor cores with cache management.

FIG. 6 is a system block diagram illustrating processor cores with cache management. In embodiments, processor cores can be coupled to a local cache. The processor cores can be arranged into groupings of two or more processor cores. The local cache can be loaded with data from a source such as a common memory structure. The processor cores coupled to the local cache can process the data within the cache, causing the data to become "dirty" or different from the contents of the common memory. Since multiple groupings of processor cores can each be coupled to their own local caches, the problem of incoherency between the contents of the common memory structure and the local caches becomes highly complex. To resolve the coherency challenges, one or more coherency management operations can be applied to the data within the local caches and the common memory structure. An operation such as a "snoop" operation can examine common memory and cache access operations to ensure that the access operations can be ordered so that cache coherency problems can be avoided. The coherency management operations enable cache management using shared cache line storage. A plurality of processor cores is accessed, wherein the plurality of processor cores comprises a coherency domain, and wherein two or more processor cores within the plurality of processor cores generate read operations for a common memory structure coupled to the plurality of processor cores. Coherency is managed for the coherency domain using a compute coherency block (CCB), wherein the CCB includes a memory queue for storing cache lines determined by the CCB. Snoop requests are generated, by the CCB, wherein the snoop requests correspond to entries in the memory queue. Cache lines are transferred between the CCB and a bus interface unit, based on a response to the snoop requests, wherein the bus interface unit controls memory accesses. The cache line transfer is controlled by the memory queue.

A system block diagram 600 of processor cores with cache management is shown. A multicore processor 610 can include a plurality of processor cores. The processor cores can include homogeneous processor cores, heterogeneous cores, and so on. In the system block diagram 600, two processor cores are shown, processor core 612 and processor core 614. The processor cores can be coupled to a common memory 620. The common memory can be shared by a plurality of multicore processors. The common memory can be coupled to the plurality of processor cores through a coherent network-on-chip 622. The network-on-chip can be colocated with the plurality of processor cores within an integrated circuit or chip, an application-specific integrated circuit (ASIC), a field programmable gate array (FPGA), and so on. The network-on-chip can be used to interconnect the plurality of processor cores and other elements within a system-on-chip (SoC) architecture. The network-on-chip can support coherency between the common memory 620 and one or more local caches (described below) using coherency transactions. In embodiments, the cache coherency transactions can enable coherency among the plurality of processor cores, one or more local caches, and the memory. The cache coherency can be accomplished based on coherency messages, cache misses, and the like.

The system block diagram 600 can include a local cache 630. The local cache can be coupled to a grouping of one or more processor cores within a plurality of processor cores. The local cache can include a multilevel cache. In embodiments, the local cache can be shared among the two or more processor cores. The cache can include a multiport cache. In embodiments, the grouping of two or more processor cores and the shared local cache can operate using local coherency. The local coherency can indicate to processors associated with a grouping of processors that the contents of the cache have been changed or made "dirty" by one or more processors within the grouping. In embodiments, the local coherency is distinct from the global coherency. That is, the coherency maintained for the local cache can be distinct from coherency between the local cache and the common memory, coherency between the local cache and one or more further local caches, etc.

The system block diagram 600 can include a cache maintenance element 640. The cache maintenance element can maintain local coherency of the local cache, coherency between the local cache and the common memory, coherency among local caches, and so on. The cache maintenance can be based on issuing cache transactions. In the system block diagram 600, the cache transaction can be provided by a cache transaction generator 642. In embodiments, the cache coherency transactions can enable coherency among the plurality of processor cores, one or more local caches, and the memory. The contents of the caches can become "dirty" by being changed. The cache contents changes can be accomplished by one or more processors processing data within the caches, by changes made to the contents of the common memory, and so on. In embodiments, the cache coherency transactions can be issued globally before being issued locally. Issuing the cache coherency transactions globally can ensure that the contents of the local caches are coherent with respect to the common memory.

Issuing the cache coherency transactions locally can ensure coherency with respect to the plurality of processors within a given grouping. In embodiments, the cache coherency transactions that are issued globally can complete before cache coherency transactions are issued locally. The completion of the coherency transaction issued globally can include a response from the coherent network-on-chip.

Figure 7:
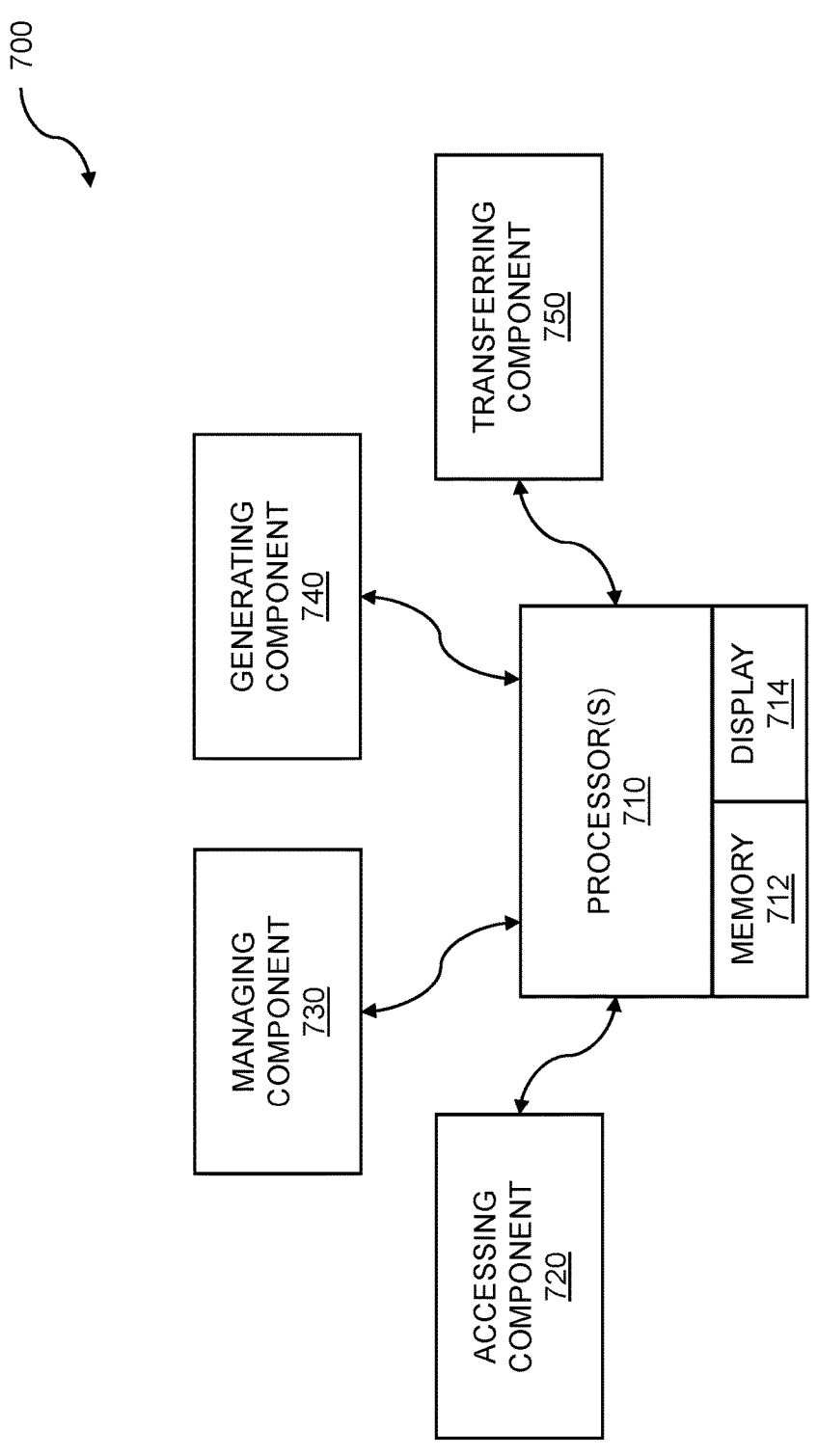
FIG. 7 is a system diagram for cache management using shared cache line storage.

FIG. 7 is a system diagram for cache management, where the cache management is enabled by cache management using shared cache line memory. The system can comprise an apparatus for cache management. The apparatus can be based on semiconductor logic. The system can include one or more of processors, memories, cache memories, queues, displays, and so on. The system 700 can include one or more processors 710. The processors can include standalone processors within integrated circuits or chips, processor cores in FPGAs or ASICs, two or more processor cores within a multiprocessor, and so on. The one or more processors 710 are attached to a memory 712, which stores operations. The memory can include one or more of local memory, cache memory, system memory, etc. The system 700 can further include a display 714 coupled to the one or more processors 710. The display 714 can be used for displaying data, instructions, operations, memory queue contents, snoop operations, snoop responses, and the like. The operations can include cache maintenance operations. The operations can further include cache maintenance operations, Advanced eXtensible Interface (AXI™) Coherence Extensions (ACE™) cache transactions, Advanced Microcontroller Bus Architecture (AMBA™) Coherence Hub Interface (CHI™) transactions, etc.

In embodiments, one or more processors 710 are coupled to the memory 712, wherein the one or more processors, when executing the instructions which are stored, are configured to: access a plurality of processor cores, wherein the plurality of processor cores comprises a coherency domain, and wherein two or more processor cores within the plurality of processor cores generate read operations for a common memory structure coupled to the plurality of processor cores; manage coherency for the coherency domain using a compute coherency block (CCB), wherein the CCB includes a memory queue for managing cache line transfers determined by the CCB; generate snoop requests, by the CCB, wherein the snoop requests correspond to entries in the memory queue; and transfer cache lines between the compute coherency block and a bus interface unit, wherein the transferring is controlled by the memory queue.

The system 700 can include an accessing component 720. The accessing component 720 can access a plurality of processor cores. The processor cores can be accessed within one or more chips, FPGAs, ASICs, etc. In embodiments, the processor cores can include RISC-V™ processor cores. In embodiments, the plurality of processor cores comprises a coherency domain. The coherency can include coherency between the common memory and cache memory, such as level 1 (L1) cache memory. L1 cache memory can include local cache coupled to groupings of two or more processor cores. The coherency between the common memory and one or more local cache memories can be accomplished using cache maintenance operations (CMOs), described previously. In embodiments, two or more processor cores within the plurality of processor cores generate read operations for a common memory structure coupled to the plurality of processor cores. The read operations for the common memory can occur based on cache misses to local cache, thereby requiring the read operations being generated for the common memory. In embodiments, each processor of the plurality of processor cores accesses a common memory structure. The access to the common memory structure can be accomplished through a coherent network-on-chip. The common memory can include on-chip memory, off-chip memory, etc. The coherent network-on-chip comprises a global coherency.

The system 700 can include a managing component 730. The managing component 730 can manage coherency for the coherency domain using a compute coherency block (CCB), wherein the CCB includes a memory queue for controlling cache line transfers determined by the CCB. The CCB can manage coherency within the coherency domain using one or more cache management operations. The cache management operations can be used to determine one or more incoherencies among processors, caches, the common memory structure, and so on. The CCB can include a snoop generator, a memory queue, and so on. The snoop generator can "snoop" memory access transactions to determine whether processors have generated access requests to a physical address within the common memory. In embodiments, the memory queue can include an evict queue. The evict queue can include cache lines which can be evicted from the memory queue to the common memory or other storage structure. In other embodiments, the memory queue can include a miss queue. The miss queue can include memory access requests to physical addresses that are not represented within a cache such as a local cache. In embodiments, the miss queue can contain information on cache lines that have been read or will be read from the common memory structure.

A cache maintenance operation can be performed to maintain cache coherency. The cache coherency maintenance can be applied to a shared local cache coupled to two or more processor cores, one or more local caches, the common memory, and so on. Various cache maintenance operations (CMOs) can be performed. The cache maintenance operations can include a subset of operations such as cache block operations (CBOs). The cache block operations can update a state associated with all caches such as the local L1 caches. The updated state can include a specific state with respect to the common memory. In embodiments, the cache block operations can include zeroing a cache line; making all copies of a cache line consistent with a cache line from the common memory while leaving the consistent copies in the local caches; flushing "dirty" data for a cache line then invalidating copies of the flushed, dirty data; and invalidating copies of a cache line without flushing dirty data to the common memory.

The cache maintenance operation generates cache coherency transactions between the global coherency and the local coherency. The global coherency can include coherency between the common memory and the local caches, among local caches, and so on. The local coherency can include coherency between a local cache and local processors coupled to the local cache. Maintaining the local cache coherency and the global coherency is complicated by the use of a plurality of local caches. Recall that a local cache can be coupled to a grouping of two or more processors. While the plurality of local caches can enhance operation processing by the groupings of processors, there can exist more than one dirty copy of one or more cache lines present in any given local cache. Thus, the maintaining of the coherency of the contents of the caches and the system memory can be carefully orchestrated to ensure that valid data is not overwritten, stale data is not used, etc. The cache maintenance operations can be enabled by an interconnect. In embodiments, the grouping of two or more processor cores and the shared local cache can be interconnected to the grouping of two or more additional processor cores and the shared additional local cache using the coherent network-on-chip.

In embodiments, the system 700 comprises cache management through implementation of semiconductor logic. One or more processors can execute instructions which are stored to generate semiconductor logic to: access a plurality of processor cores, wherein each processor of the plurality of processor cores accesses a common memory through a coherent network-on-chip, and wherein the coherent network-on-chip comprises a global coherency; couple a local cache to a grouping of two or more processor cores of the plurality of processor cores, wherein the local cache is shared among the two or more processor cores, wherein the grouping of two or more processor cores and the shared local cache operates using local coherency, and wherein the local coherency is distinct from the global coherency; and perform a cache maintenance operation in the grouping of two or more processor cores and the shared local cache, wherein the cache maintenance operation generates cache coherency transactions between the global coherency and the local coherency.

The system 700 can include a generating component 740. The generating component 740 can generate snoop requests by the CCB, wherein the snoop requests correspond to entries in the memory queue. A snoop operation can monitor a bus, an interface, and so on for memory access operations that can change data, require data before the data is changed, and so on. A snoop operation can include monitoring one or more physical addresses for changes in the shared data at the physical addresses. When changes are detected, the changes to shared data can be propagated to all copies of the shared data. The shared copies can be stored in one or more local caches, one or more queues, and the like. The snoop requests can also be used to examine the contents of the memory queue. Discussed previously, the memory queue can include an evict queue, where the evict queue contains cache lines evicted from the CCB. In embodiments, the evict queue can include one or more cache lines each comprising a number of bits. In embodiments, each cache line comprises 512 bits. The contents of the evict queue can be intended for transfer to the common memory structure (discussed below). The memory queue can further include a miss queue, where the miss queue can contain information on cache lines read from the common memory structure. The memory queues can be used to compensate for differences between the cache line width and a bus and/or interface width.

The system 700 can include a transferring component 750. The transferring component 750 can transfer cache lines between the CCB and a bus interface unit, based on a response to the snoop requests, wherein the bus interface unit controls memory accesses. In embodiments, responses can be received for the snoop requests that are generated by the CCB.

The responses can indicate whether there are differences among data in the common memory structure, one or more local caches, the memory queue, and so on. A snoop response can include data unchanged, data changed, data change pending, and so on. A snoop response can enable a transfer of cache lines between the CCB and the bus interface unit, order the transfer of cache lines, and the like. In embodiments, the transferring can occur from the CCB to the bus interface unit when the cache line is an evicted cache line. The transfer can include transferring contents of the evict queue to an evict storage area within storage block within the bus interface unit. In other embodiments, the transferring can occur from the bus interface unit to the CCB when the cache line is a pending cache line fill. The transfer can include transferring the contents from a miss storage area associated with the storage block within the BIU.

The transferring between the CCB and the bus interface unit can compensate for mismatches in bit widths, transfer rates, access times, etc. between the CCB and the bus interface unit. In embodiments, cache lines can be stored in a bus interface unit cache prior to commitment to the common memory structure. Once transferred to the BIU, the BIU can handle the transferring of cache lines such as evicted cache lines to the common memory based on the snoop responses. The transferring can include transferring the cache line in pieces or as a whole. The snoop responses can be used to determine an order in which the cache lines can be committed to the common memory. In other embodiments, cache lines can be stored in a bus interface unit cache pending a cache line fill from the common memory structure. The cache lines can be fetched as pieces or as a whole from the common memory and stored in the BIU cache. In other embodiments the ordering and the mapping can include a common ordering point for coherency management. The common ordering point can enable coherency management between a local cache and processor cores coupled to the local cache, between local caches; between local caches and the common memory; and the like. In further embodiments, the common ordering point can include a compute coherency block coupled to the plurality of processor cores. The compute coherency block can be colocated with the processor cores within an integrated circuit, located within one or more further integrated circuits, etc.

The system 700 can include a computer program product embodied in a non-transitory computer readable medium for cache management, the computer program product comprising code which causes one or more processors to generate semiconductor logic for: accessing a plurality of processor cores, wherein the plurality of processor cores comprises a coherency domain, and wherein two or more processor cores within the plurality of processor cores generate read operations for a common memory structure coupled to the plurality of processor cores; managing coherency for the coherency domain using a compute coherency block (CCB), wherein the CCB includes a memory queue for storing cache lines determined by the CCB; generating snoop requests by the CCB, wherein the snoop requests correspond to entries in the memory queue; and transferring cache lines between the compute coherency block and a bus interface unit, wherein the transferring is controlled by the memory queue.

Further embodiments include an apparatus for cache management comprising: a plurality of processor cores, wherein the plurality of processor cores comprises a coherency domain, and wherein two or more processor cores within the plurality of processor cores generate memory accesses for a common memory structure coupled to the plurality of processor cores; a compute coherency block (CCB) for managing coherency within the coherency domain, wherein the CCB is coupled to the plurality of processor cores and includes a memory queue for storing cache lines determined by the CCB; a bus interface unit, wherein the bus interface unit is coupled to the CCB and implements memory accesses; and wherein the CCB generates snoop requests, wherein the snoop requests correspond to entries in the memory queue; and cache lines are transferred between the compute coherency block and the bus interface unit, under control of the memory queue.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—maybe implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on.

In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" maybe used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for cache management comprising:

accessing a plurality of processor cores, wherein the plurality of processor cores comprises a coherency domain, and wherein two or more processor cores within the plurality of processor cores generate read operations for a common memory structure coupled to the plurality of processor cores, wherein the memory accesses are performed over a network-on-chip, wherein non-cacheable memory accesses are targeted to memory mapped input and output (I/O) locations within the common memory structure, wherein the non-cacheable memory accesses are aligned to a cache line boundary;

managing coherency for the coherency domain using a compute coherency block (CCB), wherein the CCB includes a memory queue for managing cache line transfers determined by the CCB;

generating snoop requests, by the CCB, wherein the snoop requests correspond to entries in the memory queue; and transferring cache lines between the compute coherency block and a bus interface unit, wherein the transferring is controlled by the memory queue, wherein the transferring occurs from the CCB to the bus interface unit when the cache line is an evicted cache line; and committing the evicted cache line to the common memory structure.

2. The method of claim 1 wherein the transferring is initiated based on a response to the snoop requests.

3. The method of claim 2 wherein the transferring occurs from the bus interface unit to the CCB when the cache line is a pending cache line fill.

4. The method of claim 1 wherein the memory queue comprises an evict queue.

5. The method of claim 4 wherein the evict queue controls transferring cache lines evicted from the CCB.

6. The method of claim 5 wherein the cache lines are transferred from the CCB to the bus interface unit, based on completion of all required, pending snoop responses.

7. The method of claim 1 wherein the memory queue comprises a miss queue.

8. The method of claim 7 wherein the miss queue controls transfer of cache lines read from the common memory structure to the CCB.

9. The method of claim 8 wherein cache lines in the bus interface unit are scheduled for transfer to the CCB by the miss queue, based on completion of all required, pending snoop responses.

10. The method of claim 1 wherein cache lines are stored in a bus interface unit cache prior to commitment to the common memory structure.

11. The method of claim 1 wherein cache lines are stored in a bus interface unit cache pending completion of a cache line fill from the common memory structure.

12. The method of claim 11 wherein cacheable memory accesses are targeted to storage locations within the common memory structure.

13. The method of claim 12 wherein the cache line comprises 512 bits.

14. The method of claim 1 wherein the network-on-chip is included in the coherency domain.

15. The method of claim 1 wherein the non-cacheable memory accesses comprise 8, 16, 32, or 64 bits.

16. The method of claim 1 wherein each processor within the plurality of processor cores is coupled to a dedicated local cache.

17. The method of claim 16 wherein the dedicated local cache is included in the coherency domain.

18. The method of claim 1 wherein the CCB comprises a common ordering point for coherency management.

19. A computer program product embodied in a non-transitory computer readable medium for cache management, the computer program product comprising code which causes one or more processors to generate semiconductor logic for:

accessing a plurality of processor cores, wherein the plurality of processor cores comprises a coherency domain, and wherein two or more processor cores within the plurality of processor cores generate read operations for a common memory structure coupled to the plurality of processor cores, wherein the memory accesses are performed over a network-on-chip, wherein non-cacheable memory accesses are targeted to memory mapped input and output (I/O) locations within the common memory structure, wherein the non-cacheable memory accesses are aligned to a cache line boundary;

managing coherency for the coherency domain using a compute coherency block (CCB), wherein the CCB includes a memory queue for storing cache lines determined by the CCB;

generating snoop requests, by the CCB, wherein the snoop requests correspond to entries in the memory queue; and transferring cache lines between the compute coherency block and a bus interface unit, wherein the transferring is controlled by the memory queue, wherein the transferring occurs from the CCB to the bus interface unit when the cache line is an evicted cache line; and committing the evicted cache line to the common memory structure.

20. An apparatus for cache management comprising:

a plurality of processor cores, wherein the plurality of processor cores comprises a coherency domain, and wherein two or more processor cores within the plurality of processor cores generate memory accesses for a common memory structure coupled to the plurality of processor cores, wherein the memory accesses are performed over a network-on-chip, wherein non-cacheable memory accesses are targeted to memory mapped input and output (I/O) locations within the common memory structure, wherein the non-cacheable memory accesses are aligned to a cache line boundary;

a compute coherency block (CCB) for managing coherency within the coherency domain, wherein the CCB is coupled to the plurality of processor cores and includes a memory queue for storing cache lines determined by the CCB;

a bus interface unit, wherein the bus interface unit is coupled to the CCB and implements memory accesses; and wherein the CCB generates snoop requests, wherein the snoop requests correspond to entries in the memory queue; and cache lines are transferred between the compute coherency block and the bus interface unit, under control of the memory queue, wherein transferring occurs from the CCB to the bus interface unit when the cache line is an evicted cache line; and the evicted cache line is committed to the common memory structure.

\* \* \* \* \*